United States Patent [19]

Nord

[11] Patent Number: 4,715,705
[45] Date of Patent: Dec. 29, 1987

[54] METHOD FOR PRESENTATION OF INFORMATION OF A PLURALITY OF SHEETSHAPED INFORMATION CARRIERS AND A DEVICE FOR THE ACCOMPLISHMENT OF THE METHOD

[75] Inventor: Bert Nord, Västra Frölunda, Sweden

[73] Assignee: Ingenjorsfirma B Nord AB, Sweden

[21] Appl. No.: 849,452

[22] PCT Filed: Jul. 18, 1985

[86] PCT No.: PCT/SE85/00284
§ 371 Date: Mar. 20, 1986
§ 102(e) Date: Mar. 20, 1986

[87] PCT Pub. No.: WO86/01008
PCT Pub. Date: Feb. 13, 1986

[30] Foreign Application Priority Data

Jul. 23, 1984 [SE] Sweden .................. 8403821

[51] Int. Cl.⁴ .............................. G03B 21/54
[52] U.S. Cl. ........................ 353/120; 353/DIG. 5; 353/109
[58] Field of Search ............ 353/44, 108, DIG. 5, 353/109; 40/371, 399, 372; 311/50, 51, 52; 281/45, 46; 282/29 R

[56] References Cited

U.S. PATENT DOCUMENTS 2,649,093 8/1953 Rigney .................... 211/50
2,740,326 4/1956 Reinebach ............ 353/108 X
3,250,274 5/1966 Mathiesen ............ 40/372 X
3,625,368 12/1971 Toms .................... 40/388 X
4,548,487 10/1985 Nielsen ............ 353/DIG. 5 X

FOREIGN PATENT DOCUMENTS 2396987 7/1977 France .................... 353/108

Primary Examiner—Harry N. Haroian

[57] ABSTRACT

A method and a device for presentation of information on a plurality of sheetshaped information carriers (5) which are connected to each other in a continuous series of the sheets which are folded relative each other so that the series of sheets extends zig-zag like and forms in a storage position a pack of sheets in which the sheets are connected to each other and from which the sheets can be folded out for presentation of information on the sheets. One of the outer sheets (5) of the pack is placed with an interspace relative to the pack, which is substantially a multiple, larger than 1, of the width of each sheet between said folding lines. In this way at least two sheets at a time can be held unfolded on a base in said interspace for the purpose of presentation. The series of sheets can consecutively be brought over to the outer sheet, forming a new pack during a consecutive positioning of the sheets in the interspace for the presentation. This is accomplished by the unfolded sheets in said interspace by means of folding are brought over to the new pack.

8 Claims, 8 Drawing Figures

METHOD FOR PRESENTATION OF INFORMATION OF A PLURALITY OF SHEETSHAPED INFORMATION CARRIERS AND A DEVICE FOR THE ACCOMPLISHMENT OF THE METHOD

TECHNICAL FIELD

The present invention relates to a method for presentation of information on a plurality of sheetshaped information carriers which are connected to each other in a continuous series of said sheets which along opposite edge portions are connected with each other along folding lines where close to each other positioned sheets are folded relative to each other so that said series of sheets extends zig-zag like and form in a stored position a pack of said sheets in which pack the sheets are close to each other and from which the sheets can be folded out for presentation of information on the sheets.

The present invention also relates to a device for presentation of information on a plurality of sheet-shaped information carriers which are connected to each other in a continuous series of said sheets which along opposite edge portions are connected with each other along folding lines so that the series of sheets extends zig-zag like and in a stored position can form a pack of said sheets in which pack the sheets are close to each other and from which the sheets can be folded out for presentation of information on the sheets.

BACKGROUND

For presentation of information on certain types of sheetshaped information carriers, for example overhead sheets, there is no simple and efficiently operated solution. Usually the overhead sheets are handled separately which is relatively complicated and sometimes results in mistakes, such as incorrect positioning of the sheets, which is a serious disadvantage in connection with for example a lecture. An automatically operated motor-driven device has been developed which however is very expensive and very complicated and consequently sensitive to operation disturbances.

Also within other fields, for example in connection with presentation of brochure materials there is a demand for a new and promotional way of information which for example enables to study of information simoultaneously by two persons which are positioned opposite to each other.

TECHNICAL PROBLEM

The object of the present invention is to solve the above given problems and by means of a simple method and by means of a device which is easy to transport and rationalizes the presentation of information without any need for complicated mechanisms.

Said object is obtained by means of the method and the device according to the present invention.

THE SOLUTION

The method according to the present invention is characterized by that one of the outer sheets of the pack is placed with an interspace relative to the pack, said interspace being substantially a multiple, larger than 1, of the width of each sheet between said folding lines, that in this way at least two sheets at a time can be held unfolded on a base in said interspace for the purpose of presentation and that said series of sheets consecutively can be brought over to said outer sheet, forming a new pack during a consecutive positioning of the said sheets in the said interspace for said presentation by that the unfolded sheets in said interspace by means of folding are moved over to the new pack.

The device according to the invention is characterized by that the device includes two side support means arranged on the sides of a presentation means, that said side support means are positioned with an interspace relative to each other so that at least two of said sheets can be held extended on said presentation means, that one of said side support means is arranged to support said pack of sheets, whereas the other side support means is arranged to receive sheets which consecutively are folded over to said second side support means.

BRIEF DESCRIPTION OF DRAWINGS

The present invention will in the following be closer described by means of embodiments with reference to the accompanying drawings in which FIGS. 1 and 2 schematically show a very simple device for the accomplishment of the method in a first embodiment, whereas

FIGS. 5 and 6 show a pack of information sheets, included into the device, while

PREFERRED EMBODIMENTS

Figure 1:
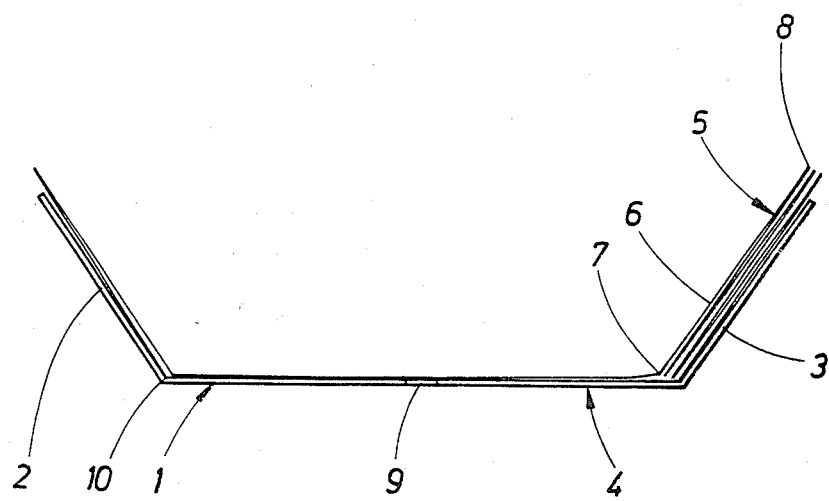
Figure 2:
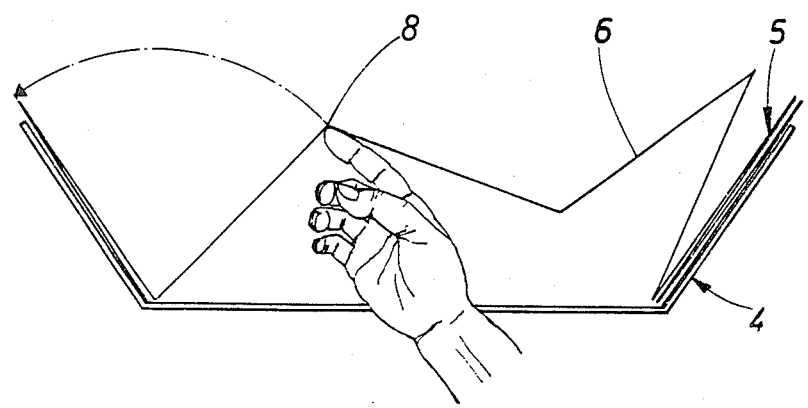

In a very simple embodiment, shown in FIGS. 1 and 2, the device according to the invention consists of a stand 1 with two inclined side supports 2, 3 arranged on the sides of a presentation member 4. The side supports 2, 3 as well as the presentation member 4 are performed as plane, plateshaped portions. The side supports are provided to take the inclined position shown in FIGS. 1 and 2, being inclined outwards from the presentation member and preferably standing free without any manual support. In its most simple form this is accomplished by the side supports 2, 3 are fixed to the presentation member and can preferably be made in one single piece of for example plateshaped plastic material which is folded to the shape as shown. In the device also a pack 5 of information sheets 6 is included and is indicated schematically in FIGS. 1 and 2 and shown separately in FIGS. 5 and 6 in a preferred embodiment. The same embodiment of the pack of information sheets can preferably be utilized with the different shown embodiments of the stand. The pack 5 of information sheets consists of a plurality of sheets 6 which for example are made in a somewhat stiff material, which for use as overhead sheets is transparent, but can be of a different kind for other purposes. Also paper material is possible for use where a direct presentation is made by studying the information sheets 6 directly. The sheets 6 are connected with each other along two of its opposite edges 7, 8 in such a way that the pack as seen from its end, that is to say from the two other edge portions extend in zig-zag shape and can for certain materials be made by folding a continuous longitudinal sheet, but are in connection with relatively stiff sheets connected with each other by means of a material with a more folding ability, for example tape or similar, as the edge portions 7, 8 form folding lines in connection with the use of the material.

The presentation member 4 has such a dimension that it can receive two extended sheets of the pack positioned close to each other and in connection with the application for overhead presentation transparent in order to be projected by light from below onto a screen. A recess 9 is made in the presentation member 4 enabling the information sheets, positioned on the presentation member, to be raised at one of said connecting edge portions enabling the information pack to be fed over the presentation member from one side to the other side. Consequently the start position is with the pack positioned substantially on one side of the presentation member 4, resting against one of the side supports, in the example shown the support to the right; if the information pack is fixed to the support, the first sheet of the pack is fixed to the sidesupport 2 to the left either so that the whole sheet is fixed to the support or so that its edge portion 10 is pivotally connected to the stand 1. The information is so adopted that the two first information supporting sheets or at least the first information sheet rests on the presentation member 4. In use for overhead presentation the stand is so positioned that one of the sheets, preferably the sheet to the right is positioned opposite to the projector so that the sheet is projected on the screen. Consequently by lifting the sheets by means of a finger from below at the recess 9 and bringing over sheet after sheet in a arcshaped motion which is indicated in FIG. 2, pairwise in a direction to the left, new sheets are fed forwards and placed on the presentation member 4 by that the sheets are continously connected to each other in the manner described above. It is apparent that in connection with use of half of the presentation member 4 for presentation, every second sheet will be positioned on one place on the presentation member involving that series of presentation should be arranged so that the information to be presented consecutively will be positioned on every second sheet and a new series can be positioned on the intermediate sheets, whereby the first series is shown consecutively by the repeated movements, whereafter the stand will be moved over so that the second part of the presentation member will be positioned opposite to the overhead projector so that the next series will be shown.

Figure 3:
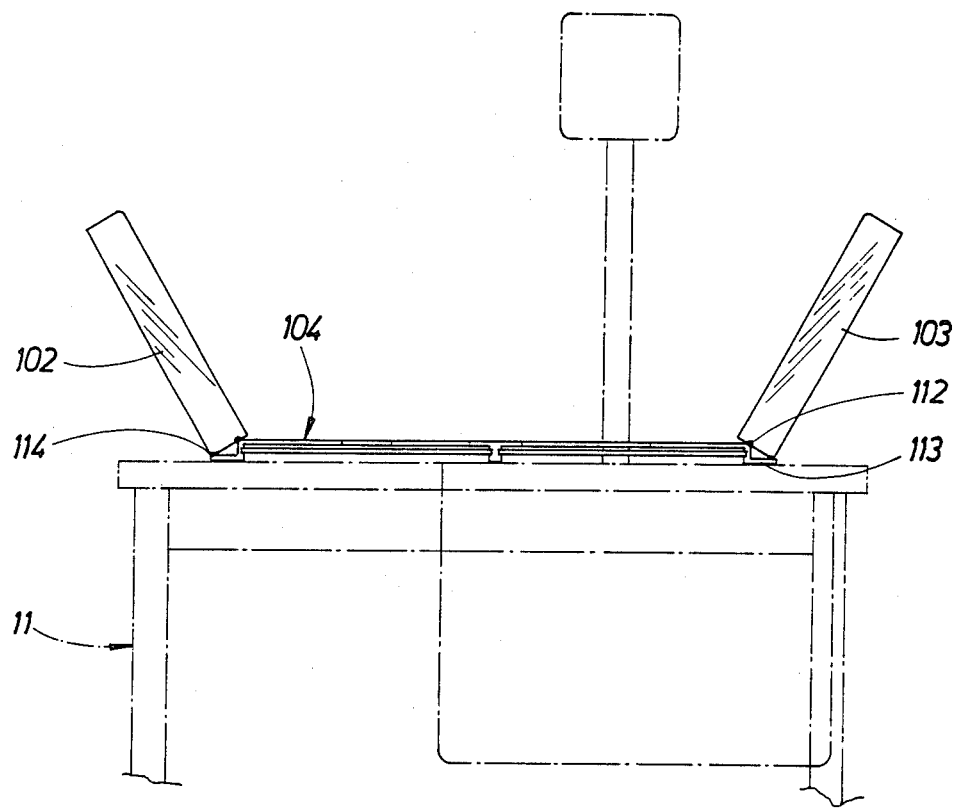
FIGS. 3 and 4 show a lateral view and a view from above of the device according to the invention in a position of utilization in a second embodiment.
Figure 4:
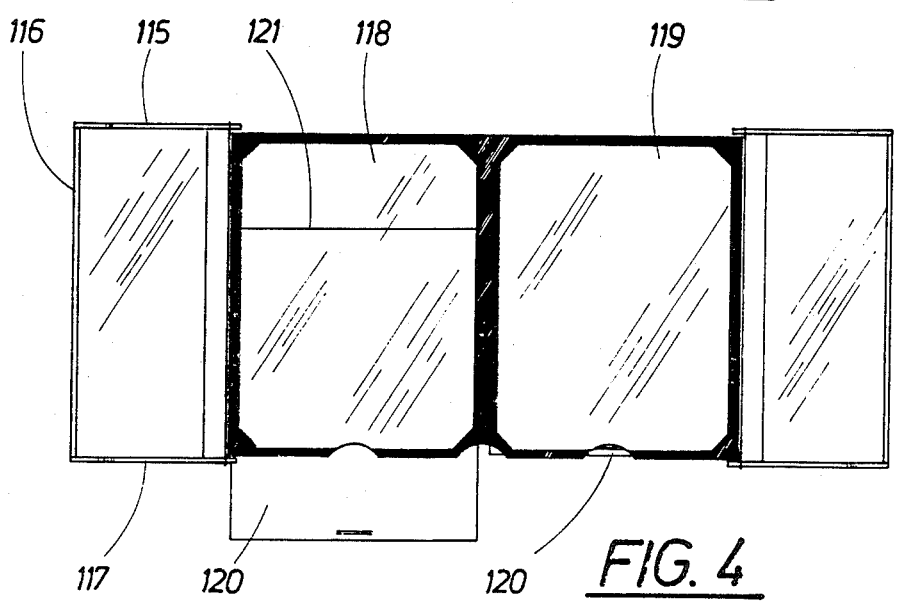

In FIG. 3 the device according to the invention is shown in a second embodiment and placed on a table 11, including an overhead projector. Those parts corresponding to the first embodiment have been given corresponding reference numerals with addition of 100. For the purpose clarity no pack of information sheets has been shown in this figure. In FIG. 3 the device is shown in a position of use. The same embodiment is also shown in FIG. 4 from above. In this embodiment the side suports 102, 103 are pivotally connected to the presentation member 104 by means of a pivot 112 on each side. The stand 1 has two support flanges 113, which keep the presentation member 104 at some height above the support surface, which in this case is the table. The support flanges also form the support for one side edge 114 of the support members 102, 103 so that they are supported in their inclined position. In this second embodiment the stand is designed as a unit which can be closed and therefore the side supports 102, 103 are designed with further side edges 115, 116, 117 which form a protection for the stand which will be a substantially closed unit by pivoting the side supports towards the presentation member to a closed position for transport and storage. The side edges 114, 115, 117 also form support edges for the pack of information sheets which are intended to be placed in the container space formed by the edges.

It is apparent from FIG. 4 that the presentation member is divided into two windows 118, 119 which are framed by means of a frame or a mask extending around each window. Below the presentation member two cover plates 120 are positioned and to be displaced in groves in the stand, which cover plates are preferably not transparent, for example white coloured in order to form a background at a direct study of the overhead sheet without projector. The cover plates 120 can also be utilized as a ruler by means of their inner edge 121 and each cover plate can be drawn out to desired position during the presentation by means of the projector. In connection with a conventional presentation by means of overhead projector at least one cover plate is removed at the time.

Figure 5:
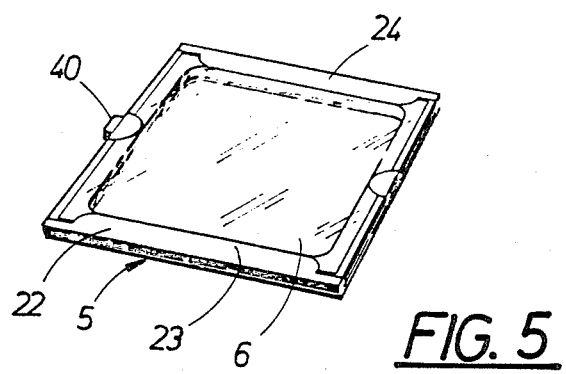
Figure 6:
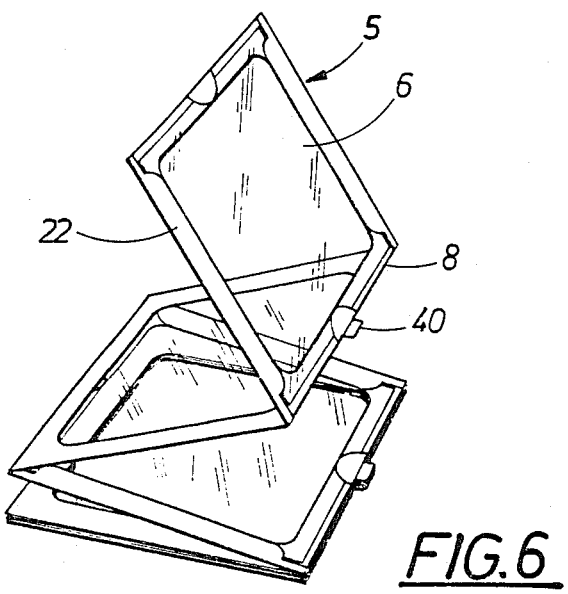

The embodiment of the pack 5 of information sheets shown in FIGS. 5 and 6 has a frame 22 of for example plastic or paper which gives each sheet the required stiffness, whereby the frame 22 is preferably not transparent contrary to the sheets 6 themselves. The frame can also form a holder for separate information sheets, for example overhead sheets, which can be fixed by being inserted between two opposite flaps 23, 24 of the frame and the transparent sheets. The sheet can also be fixed by means of for example tape. The information can also be applied directly to the sheet by writing with a special pen directly on the sheet. Alternatively text or pictures can be printed on the sheets. In this embodiment special flaps 40 are positioned at the fold line 8 between two sheets 6 positioned close to each other, which in this case are utilized to fold the sheets in order to move the same during the presentation. Contrary to what was made in connectin with the first embodiment one grips the flap 40 by means of the fingers of one's hand and makes an arcshaped movement in the direction against one of the side supports 2, 102. FIG. 6 shows a somewhat artificial position of the sheets 6 in the information pack 5 in order to better show the design of the pack.

Figure 7:
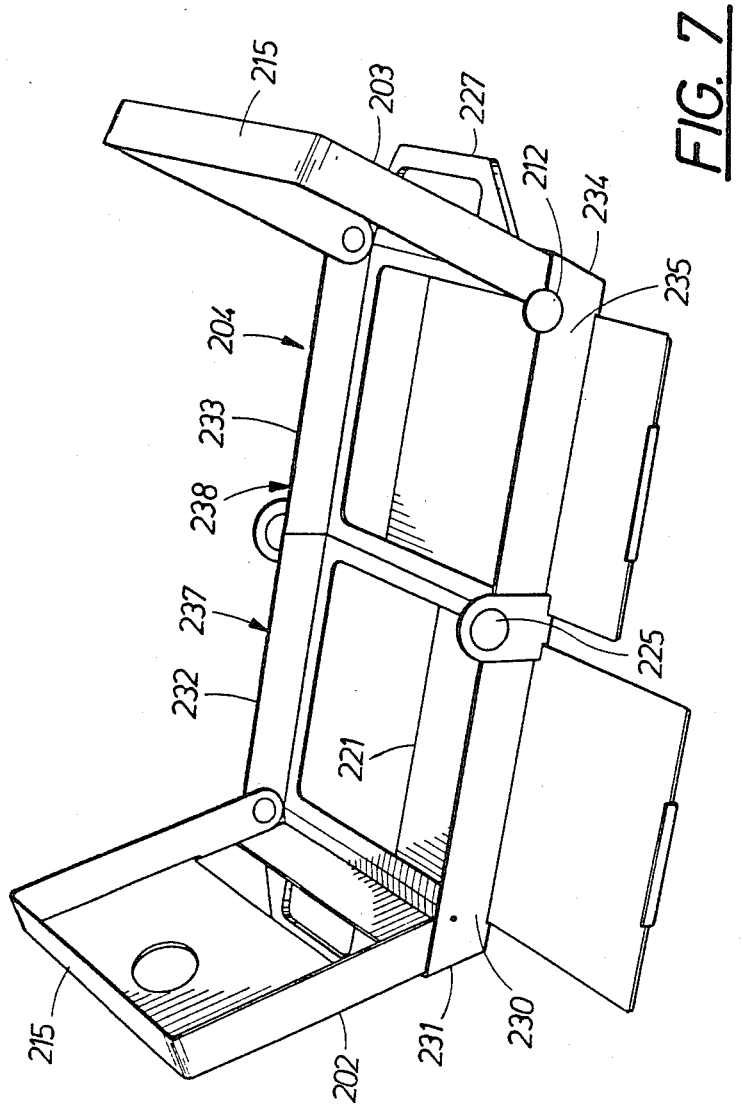
FIG. 7 shows a perspective view of the device according to a third embodiment in a position of utilization.
Figure 8:
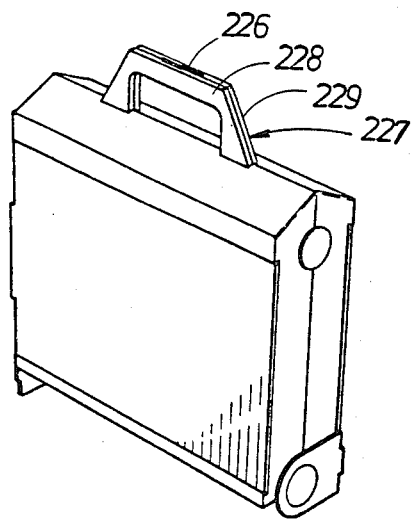
FIG. 8 shows a perspective view of the third embodiment of the device in a closed position.

In FIGS. 7 and 8 a third embodiment is shown in which the parts corresponding to the parts in FIGS. 1–4 have been given the same reference numerals with addition to further 100 and 200 respectively. The presentation member is in this embodiment pivotable which occurs along its center line, the pivot is given the number 225. The stand is kept in its closed position by means of a snaplock 226 and has the appearance of a briefcase. The snaplock can be positioned in a handle 227 consisting of two handlehalves 228, 229. The side supports 202, 203 can be designed in a non-transparent material or can be covered by means of a cover of leather imitation, leather or similar. The cover plates 220 form the sides of the stand and are kept in a closed position by means of preferably snaplocks, not shown. The presentation member 204 has side edges 230–235 which in the closed position close the endparts and the upper part of the stand. The side edges 231, 234 are inclined and form end position supports for the side supports 202, 203. The side supports are in the closed position of the stand enclosed by the folded presentation member 4 which however below is closed by means of the upper side edges 215 of the side supports. The pivots 212 have a further snaplock on each side by being provided with a projection which can snap into the recess 236 in the side edges 230, 233.

As is apparent from FIGS. 7 and 8 two parts 237, 238 of the presentation member are completely identical which involves lower manufacturing costs.

As is indicated above the device need not to be limited to the use for overhead presentation, but can be arranged as a presentation material for sales personnel or similar. In this connection the presentation member 104 need not be made in a transparent material simultaneously as a pack of information sheet need not be transparent, but can be made in a strong paper or plastic material with printed information. The information can be doubled so that two information sheets which are positioned on the presentation member contain the same information but reversly directed so that two persons sitting opposite each other can discuss and comfortably study the same information.

The invention is not limited to the embodiments described above and shown in the drawings, but can be modified within the scope of the accompanying claims. For example the above described technic can per se be utilized in a different way, for example for books, such as picture volumes or books for children where a continuous picture with a continuous content can be fed forward on the presentation member.

However, it is not sufficient to have merely a separate pack of information sheets but it is important for the invention that outer sheets of the pack are kept in position at a distance between the outer sheets which is substantially a multiple, larger than 1, of the distance of the sheets between the folding lines on each sheet so, that at least two sheets at a time can be positioned extended between the positioning means for the outer sheets which means in the shown examples consist of the side supports. Further it is imaginable that the side supports lay down substantially parallel with the presentation member. In the embodiment according to FIGS. 7 and 8 the windows which can be closed by the coverplates can be completely open or consist of a transparent sheet material.

I claim:

1. A device for presentation of information including a plurality of sheetshaped information carriers which are connected to each other in continuous series of said sheets, which sheets along opposite edge portions are connected with each other along folding lines so that the series of sheets extends zig-zag like and in a stored position form a pack of said sheets, in which pack the sheets are close to each other and from which the sheets can be folded out for presentation of information on the sheets, said device further including two side support means arranged on the sides of a presentation means, said presentation means being pivotable along a central line around a pivot, said side support means being positioned with an interspace relative to each other, said interspace being approximately twice the width of each sheet between said folding lines so that two of said sheets can be held extended on said presentation means, one of said side supports being arranged to support said pack of sheets, whereas the other side support means is arranged to receive sheets which consecutively are folded over to said second side support means.

2. A device according to claim 1, wherein the side support means are arranged to be inclined outwards relative to the presentation means.

3. A device according to claim 2, wherein the side support means consist of plateshaped portions which are arranged to be pivoted towards the presentation means to a closed position for the device.

4. A device according to claim 3, wherein the side support means have side edges which form protection and support edges for the pack.

5. A device according to claim 1, wherein the presentation means has side edges which in the closed position of the device form a substantially closed unit.

6. A device according to claim 5, wherein the presentation means has a handle whereby the device in its closed position can be carried as a brief-case.

7. A device for presentation of information including a plurality of transparent sheetshaped information carriers which are connected to each other in continuous series of said sheets, which sheets along opposite edge portions are connected with each other along folding lines so that the series of sheets extends zig-zag like and in a stored position form a pack of said sheets, in which pack the sheets are close to each other and from which the sheets can be folded out for presentation of information on the sheets, said device further including two side support means arranged on the sides of a presentation means, said presentation means being provided with two displaceable cover plates which are not transparent and arranged to form a background for the sheets, said side support means being positioned with an interspace relative to each other, said interspace being approximately twice the width of each sheet between said folding lines so that two of said sheets can be held extended on said presentation means, one of said side support means being arranged to support said pack of sheets, whereas the other side support means is arranged to receive sheets which consecutively are folded over to said second side support means.

8. A device for presentation of information including a plurality of transparent sheetshaped information carriers which are connected to each other in continuous series of said sheets, which sheets along opposite edge portions are connected with each other along folding lines so that the series of sheets extends zig-zag like and in a stored position form a pack of said sheets, in which pack the sheets are close to each other and from which the sheets can be folded out for presentation of information on the sheets, said device further including two side support means arranged on the sides of a presentation means, said presentation means being provided with two displaceable cover plates which are not transparent and arranged to form a ruler with their inner edges, whereby a respective plate is partly displaced outwards, said side support means being positioned with an interspace relative to each other, said interspace being approximately twice the width of each sheet between said folding lines so that two of said sheets can be held extended on said presentation means, one of said side support means being arranged to support said pack of sheets, whereas the other side support means is arranged to receive sheets which consecutively are folded over to said second side support means.

* * * * *